United States Patent
Kawaguchi et al.

(10) Patent No.: US 11,217,385 B2
(45) Date of Patent: Jan. 4, 2022

(54) TRANSFORMER AND ELECTRIC POWER CONVERTER

(71) Applicant: Hitachi, Ltd., Tokyo (JP)

(72) Inventors: Yuki Kawaguchi, Tokyo (JP); Junpei Kusukawa, Tokyo (JP); Yasuaki Norimatsu, Tokyo (JP); Takae Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 16/317,904

(22) PCT Filed: Sep. 13, 2016

(86) PCT No.: PCT/JP2016/076895
§ 371 (c)(1),
(2) Date: Jan. 15, 2019

(87) PCT Pub. No.: WO2018/051390
PCT Pub. Date: Mar. 22, 2018

(65) Prior Publication Data
US 2021/0287849 A1    Sep. 16, 2021

(51) Int. Cl.
*H01F 27/32*    (2006.01)
*H01F 27/38*    (2006.01)
(Continued)

(52) U.S. Cl.
CPC ............. *H01F 27/38* (2013.01); *H01F 3/14* (2013.01); *H01F 27/24* (2013.01); *H01F 27/325* (2013.01); *H02M 3/33569* (2013.01)

(58) Field of Classification Search
CPC .......... H01F 27/38; H01F 3/14; H01F 27/325; H01F 27/24; H01F 5/02; H01F 2005/025;
(Continued)

(56) References Cited

U.S. PATENT DOCUMENTS 3,665,288 A * 5/1972 Godawski ............... H01F 38/42
315/411
3,750,073 A * 7/1973 Okano ...................... H01F 5/02
336/198
(Continued)

FOREIGN PATENT DOCUMENTS

JP         8-64432 A      3/1996
JP    2001-338819 A     12/2001
(Continued)

OTHER PUBLICATIONS

International Search Report (PCT/ISA/210) issued in PCT Application No. PCT/JP2016/076895 dated Dec. 6, 2016 with English translation (three (3) pages).
(Continued)

*Primary Examiner* — Mang Tin Bik Lian
(74) *Attorney, Agent, or Firm* — Crowell & Moring LLP (57) ABSTRACT

In order to provide a transformer and an electric power converter which are less likely to become deteriorated with time and which have stable insulation performance, the transformer according to the present invention is provided with: a core; a bobbin in which a low-voltage-side primary winding and a high-voltage-side secondary winding are disposed along the central magnetic leg of the core; and a bobbin support part that supports the bobbin at an end of the bobbin on the primary winding side, such that an air gap is provided between the central magnetic leg of the core and a surface of the bobbin corresponding to the secondary winding.

12 Claims, 11 Drawing Sheets

(51) Int. Cl.
*H01F 3/14* (2006.01)
*H01F 27/24* (2006.01)
*H02M 3/335* (2006.01)

(58) Field of Classification Search
CPC ... H01F 5/06; H01F 3/00; H01F 17/04; H01F 27/26
See application file for complete search history.

(56) References Cited

U.S. PATENT DOCUMENTS

| | | | | |
|---|---|---|---|---|
| 4,000,483 | A * | 12/1976 | Cook | H01F 27/325 336/98 |
| 4,234,865 | A * | 11/1980 | Shigehara | H01F 27/02 336/192 |
| 4,305,056 | A * | 12/1981 | Mochida | H01F 3/14 29/606 |
| 4,518,938 | A * | 5/1985 | Bartholomaus | H01F 7/1607 335/255 |
| 4,587,506 | A * | 5/1986 | Hoeksma | H01F 27/306 336/178 |
| 4,858,095 | A * | 8/1989 | Narita | H03B 9/10 363/21.04 |
| 4,885,445 | A * | 12/1989 | Taniguchi | H05B 6/64 219/760 |
| 5,559,486 | A * | 9/1996 | Ikenoue | H01F 19/04 336/192 |
| 6,522,233 | B1 * | 2/2003 | Kyoso | H01F 27/306 336/192 |
| 8,766,756 | B2 * | 7/2014 | Hester | H01F 27/30 336/90 |
| 8,933,772 | B2 * | 1/2015 | Suzuki | H01F 27/263 336/198 |
| 9,837,194 | B1 * | 12/2017 | Folker | H01F 27/40 |
| 2008/0079525 | A1 * | 4/2008 | Sundaram | H01F 27/289 336/182 |
| 2010/0176907 | A1 * | 7/2010 | Hayasaki | H01F 27/33 336/220 |
| 2013/0027173 | A1 * | 1/2013 | Ohsawa | H01F 27/306 336/220 |
| 2014/0184375 | A1 * | 7/2014 | Murata | H01F 27/28 336/196 |
| 2014/0266537 | A1 * | 9/2014 | Bichler | H01F 27/24 336/178 |
| 2014/0307481 | A1 * | 10/2014 | Wang | H02M 3/285 363/17 |
| 2015/0302969 | A1 * | 10/2015 | Aaron | G06F 30/36 336/208 |
| 2017/0222541 | A1 * | 8/2017 | Barbosa | H02M 1/32 |

FOREIGN PATENT DOCUMENTS

| | | |
|---|---|---|
| JP | 2007-201207 A | 8/2007 |
| JP | 2010-33870 A | 2/2010 |
| JP | 2011-54416 A | 3/2011 |

OTHER PUBLICATIONS

Japanese-language Written Opinion (PCT/ISA/237) issued in PCT Application No. PCT/JP2016/076895 dated Dec. 6, 2016 (three (3) pages).

* cited by examiner

FIG. 13

TRANSFORMER AND ELECTRIC POWER CONVERTER

TECHNICAL FIELD

The present invention relates to a transformer and an electric power converter using the transformer.

BACKGROUND ART

Recently, solid state transformers (hereinafter, referred to as SST) have been potentially applied as transformers used in, for instance, system interconnections. The SST is a high frequency transformer operated with a high frequency of several kHz to 100 kHz. Here, used is a combination of the SST, a converter used to operate the high frequency transformer, and an inverter that uses an output voltage of the converter to convert it to an AC voltage with a frequency of several dozen Hz, which frequency is the same as of a system of interest. This combination should replace conventional transformers.

According to the configuration of the SST, an electric power converter such as a converter and an inverter may be added to this transformer. Here, the transformer is operated with a high frequency of several kHz to 100 kHz, thereby making the transformer markedly smaller and lighter than the conventional transformers.

Meanwhile, a high voltage relative to the ground is superimposed on a secondary winding of a transformer used for a system interconnection. From the viewpoint of cooling performance and the structure, a magnetic core (hereinafter, referred to as a core) of the transformer is mounted such that the potential thereof is the same as of the ground or low-voltage side. Thus, it is necessary to keep a withstand voltage between the secondary winding, on which a high voltage is superimposed, and the core, the potential of which is of the ground or low-voltage side.

A method for keeping the withstand voltage includes: providing an air gap between a core and a bobbin around which a winding is mounted; and adjusting an electrostatic capacity ratio determined depending on a material characteristic of the bobbin, the thickness of the bobbin, and a size of the air gap, so that a local magnetic field concentration is reduced.

However, the air gap between the core and the bobbin may be unbalanced in size. That is, the air gap between the core and the bobbin may become locally smaller. In this case, the problem is that a magnetic field concentration occurs in a portion between the core and the winding, causing their insulation performance to decrease.

Patent Literature 1 discloses a structure in which a space is provided between a winding-mounted bobbin and a magnetic core disposed in a center hole portion of the bobbin and an insulating material is inserted in the space. The technology disclosed in Patent Literature 1 makes it possible to uniformly provide an air gap between the bobbin and the magnetic core. In addition, even if any crack or defect occurs in the bobbin, the insulating material can prevent an insulation breakdown between the winding and the magnetic core. This enables the transformer to become smaller while keeping a withstand voltage between the winding and the magnetic core.

CITATION LIST

Patent Literature

Patent Literature 1: Japanese Patent Application Publication No. 2010-033870

SUMMARY OF INVENTION

Technical Problem

Unfortunately, in the technology described in Patent Literature 1, the insulating material is inserted between the core and the center hole portion of the winding-mounted bobbin, and there is a concern that the insulating material becomes deteriorated with time to generate a void. When the void occurs in the insulating material, a magnetic field may be concentrated on the void. This causes a problem of decreasing insulation performance of the transformer. Besides, because the insulating material is used, the cost of the transformer increases.

The purpose of the present invention is to provide a transformer and an electric power converter which are less likely to become deteriorated with time and which have stable insulation performance.

Solution to Problem

To solve the above problem, an aspect of the present invention provides a transformer comprising:
a core;
a bobbin in which a low-voltage-side primary winding and a high-voltage-side secondary winding are disposed along a central magnetic leg of the core; and
a bobbin support part that supports the bobbin at an end of the bobbin on a primary winding side to provide an air gap between the central magnetic leg of the core and a surface of the bobbin corresponding to the secondary winding.

In addition, another aspect of the present invention provides an electric power converter comprising
a plurality of electric power conversion units, each including the transformer according to the transformer according to the above-described aspect, a primary-side circuit, and a secondary-side circuit,
wherein multiple inputs of the plurality of electric power conversion units are connected in parallel and multiple outputs of the plurality of electric power conversion units are connected in series

Advantageous Effects of Invention

According to the transformer of the present invention and the electric power converter using the transformer, an air gap between a core and a bobbin can be provided uniformly and their insulation characteristics are not changed with time, so that the insulation performance is highly reliable.

DESCRIPTION OF EMBODIMENTS

The following describes, in detail, transformers and electric power converters according to embodiments of the present invention.

In a transformer according to an embodiment, magnetic cores (hereinafter, referred to as cores) are mounted such that the potential thereof is the same as of the ground or low-voltage side; a low-voltage-side primary winding and a high-voltage-side secondary winding are disposed along a central magnetic leg thereof; and a bobbin support part is provided at an end of a bobbin, around which the primary winding and the secondary winding are wound, on the primary winding side, such that an air gap is provided between the high-voltage-side secondary winding and the corresponding core.

This makes it possible to reduce a variation in withstand voltage between the high-voltage-side secondary winding and the corresponding core and the withstand voltage deterioration over time, thereby making the transformer highly reliable.

In addition, there may be an power converter using transformers according to the embodiment and having a plurality of primary windings connected in parallel and a plurality of secondary windings thereof connected in series In this electric power converter, a high voltage is superimposed on the secondary winding side of each transformer, so that an insulation breakdown between the secondary winding and the corresponding core may occur in a transformer having the highest output voltage. The transformers according to the above embodiment can be applied to such an electric power converter to reduce the dispersion in withstand voltage and the deterioration over time. This also makes it easy to identify a transformer having the insulation breakdown and thus manage equipment.

Hereinafter, the present bobbin support structure is described in detail.

Embodiment 1

Figure 1:
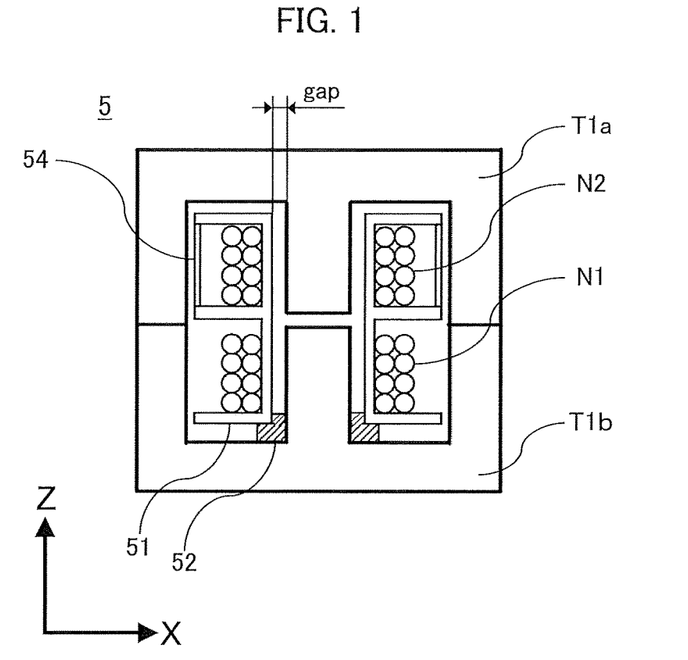
FIG. 1 is a cross-sectional view of a transformer according to Embodiment 1 when viewed along a central magnetic leg direction.

FIG. 1 is a cross-sectional view of a transformer 5 according to Embodiment 1 when viewed along a central magnetic leg direction.

In FIG. 1, the top-to-bottom direction (Z-axis direction) of the paper is defined as a gravity direction; and the left-to-right direction (X-axis direction) and a direction vertical to the paper face (Y-axis direction; not shown) define a horizontal surface perpendicular to the gravity direction.

The transformer 5 of Embodiment 1 is structured such that a primary winding N1 and a secondary winding N2, which are composed of solid or litz wires, are wound around cores T1a and T1b through a bobbin 51. A primary-side circuit 4 (see FIG. 5) on the low-voltage side is connected to the primary winding N1 and a secondary-side circuit 6 (see FIG. 5) is connected to the secondary winding N2. In this way, electric power is transmitted from the primary-side circuit 4 to the secondary-side circuit 6.

The cores T1a and T1b are composed of a PQ core, an E-type core, and/or a UU core and have two opening sections. A core gap is depicted around the central magnetic leg of the cores T1a and T1b in FIG. 1. This core gap determines a core inductance by adjusting an AL factor, which indicates core characteristics, and is thus irrelevant to the present invention.

The bobbin 51 has sections, in which the primary winding N1 and the secondary winding N2 are separately mounted in the core-axis direction, to give a sectioned winding configuration.

A winding cover 54 covers the secondary winding N2, and an insulation distance between the secondary winding N2 and an outer magnetic leg of the cores T1a and T1b is thus kept.

A bobbin support part 52 is fit into a center hole of the bobbin 51 around which the primary winding N1 and the secondary winding N2 are wound at a base portion of the central magnetic leg of the core T1b. The central magnetic leg of the core T1b is fit into an opening of the bobbin support part 52. This supports the leg such that an air gap, a "gap", with a given size is retained between the bobbin 51 and the central magnetic leg of the core T1a.

In addition, the bobbin support part 52 defines a distance between the bobbin 51 and a bottom-part magnetic legs of the core T1b and a distance between the bobbin 51 and a bottom-part magnetic legs of the core T1a.

The bobbin 51 and the bobbin support part 52 are made of insulating material such as polyethylene terephthalate and polybutylene phthalate (PBT resin). For the transformer 5 of FIG. 1, the bobbin 51 and the bobbin support part 52 are separated but may be integrally molded.

In addition, the bobbin support part 52 may be provided as a spacer used to retain an air-gap gap, between the secondary winding N2 and the central magnetic leg of the core T1a; and a base that defines a distance between the bobbin 51 and the bottom-part magnetic legs of the core T1b. The spacer and the base may be separately molded and then bonded.

Figure 2:
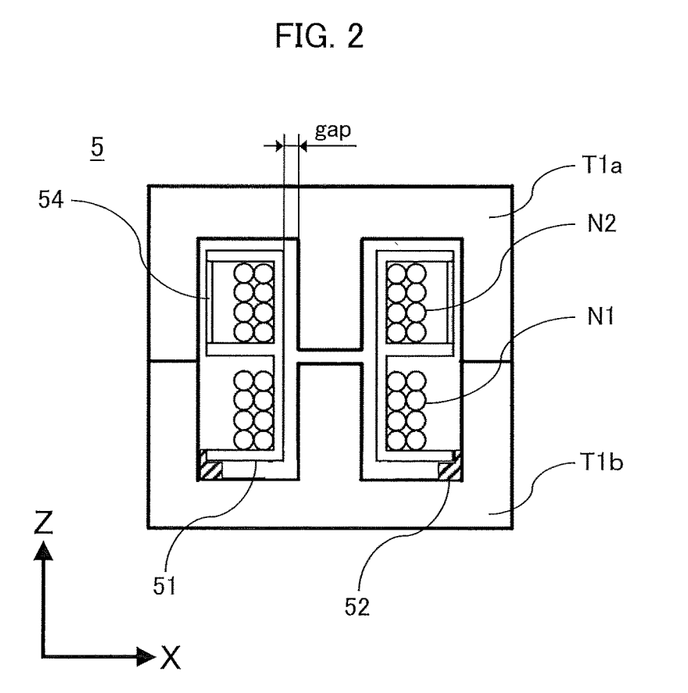
FIG. 2 is a cross-sectional view of the transformer in which a bobbin support part is modified in Embodiment 1.

FIG. 2 is a cross-sectional view of the transformer in which the bobbin support part 52 according to Embodiment 1 is modified.

In FIG. 2, the bobbin support part 52 is fit for an inner surface of a base portion of the outer magnetic leg of the core T1b and is fit for an outer circumference of a flange of the bobbin 51 on the primary winding side, and the bobbin support part 52 supports them such that an air gap, a "gap", with a given size is retained between the bobbin 51 and the central magnetic leg of the core T1a.

In addition, the bobbin support part 52 defines a distance between the bobbin 51 and the bottom-part magnetic legs of the core T1b and a distance between the bobbin 51 and the bottom-part magnetic legs of the core T1a.

Figure 3:
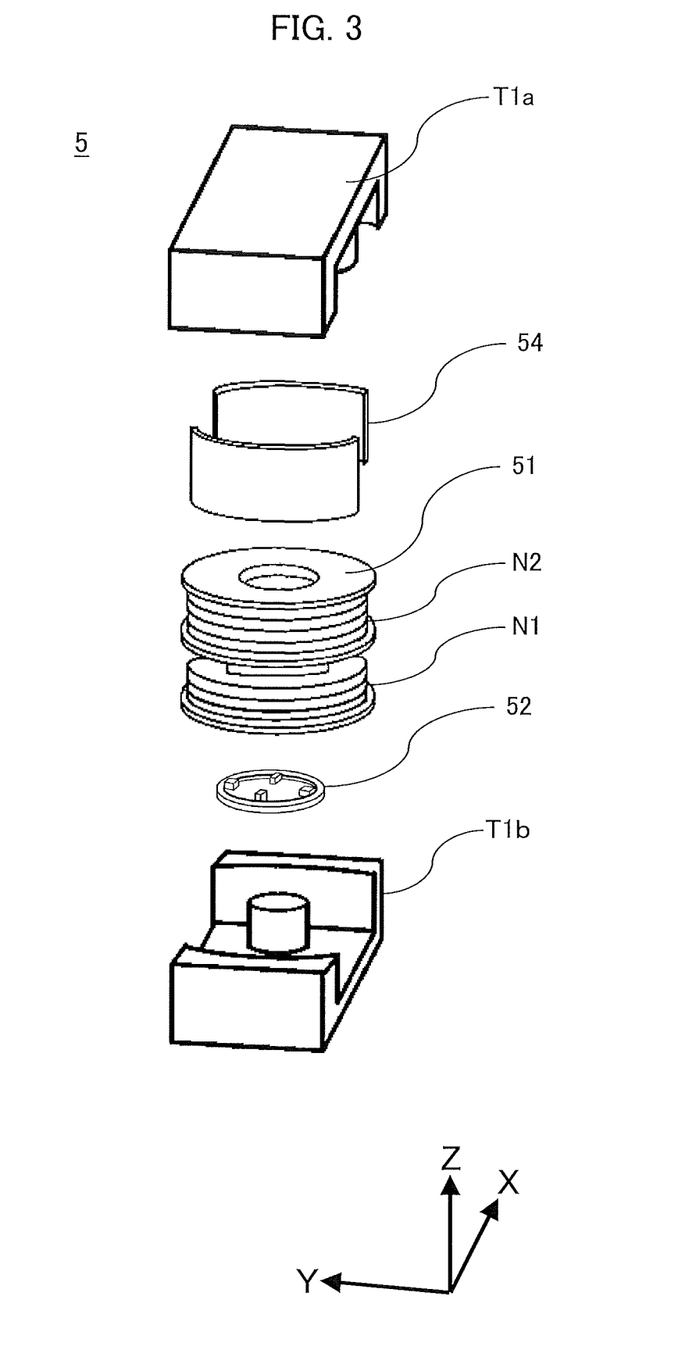
FIG. 3 is an exploded view of the transformer according to Embodiment 1 when viewed along a central magnetic leg direction.

FIG. 3 is an exploded view of the transformer 5 shown in FIG. 1 when viewed along a central magnetic leg direction.

The bobbin support part 52 is fit for the central magnetic leg of the core T1b and this bobbin support part 52 is also fit for the bobbin 51 around which the primary winding N1 and the secondary winding N2 are wound to give a stacked structure.

The core T1a is placed on the core T1b.

Regarding the transformer 5 depicted in FIGS. 1 and 3, the primary winding N1 is arranged on the lower side in the gravity direction and the secondary winding N2 is arranged on the upper side. However, the secondary winding N2 may be arranged on the lower side in the gravity direction and the primary winding N1 may be arranged on the upper side.

At this time, the bobbin 51 may be arranged such that the secondary winding N2 is wound on the lower side in the gravity direction and the primary winding N1 is wound on the upper side. Then, the bobbin 51 is suspended by using the bobbin support part 52 and is placed on the core T1a to give a better structure.

Figure 4:
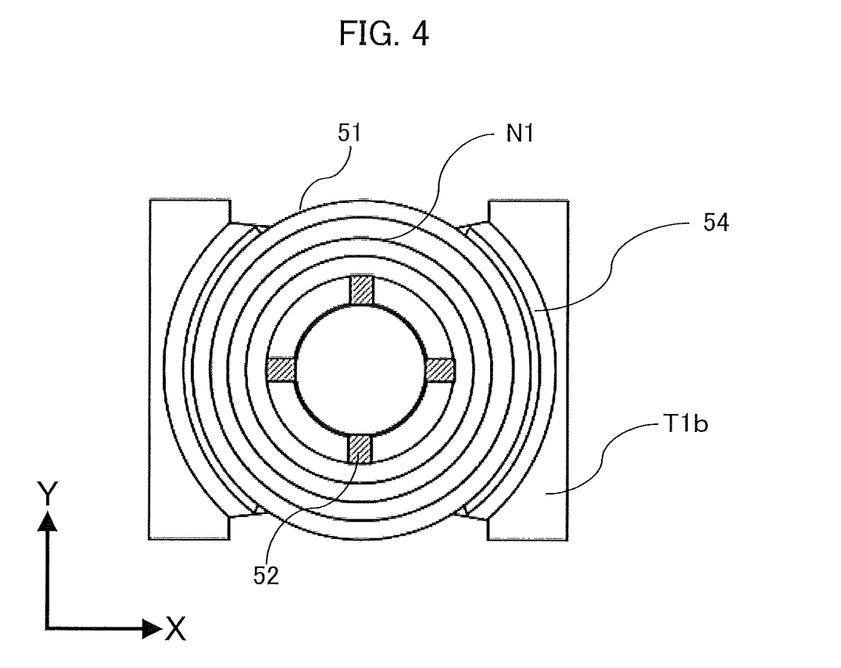
FIG. 4 is a plane view of the transformer according to Embodiment 1 when viewed in a central magnetic leg direction.

FIG. 4 is a plane view when viewed, in the central magnetic leg direction of the core T1b, from an attachment interface between the cores T1a and T1b.

Here, 4 protrusions of the bobbin support part 52 are in contact with the central magnetic leg and disposed along the opening circumferential direction. The number of the protrusions is not limited to this number. However, the protrusions may cause a decrease in withstand voltage, so that the number should be as small as possible.

In the transformer 5 of Embodiment 1, the two windings are vertically separated; and the bobbin support part is provided between an end of the winding-mounted bobbin and the bottom-part magnetic leg of the relevant core. This makes it possible to retain a space and a creeping distance between the spacer and the winding on which a high voltage is superimposed.

Further, it is also possible to reduce a deviation between the center axis of the center hole portion of the bobbin and the center axis of the central magnetic leg of the cores. This can keep uniform the air gap between a wall surface of the center hole portion of the bobbin and the central magnetic leg of the cores.

This configuration should improve insulation performance of the transformer and improve reliability because dispersion in the insulation performance is reduced.

In addition, because the bobbin support part is provided, an air gap between the bottom-part magnetic leg of each core and the bobbin can be retained. Then, a space and a creeping distance between the winding, which is mounted on the lower side of the bobbin, and the corresponding core are also retained. This makes it possible to retain insulation performance between the winding, which is mounted on the lower side of the bobbin, and the corresponding core.

In the above transformer 5, the bobbin support part 52 supports the bobbin 51 on the low-voltage winding side such that an air gap is formed between the high-voltage-side winding and the central magnetic leg of the cores. The air gap at this time may be composed of air as well as may be composed of insulation gas such as SF6 gas (sulfur hexafluoride gas).

Figure 5:
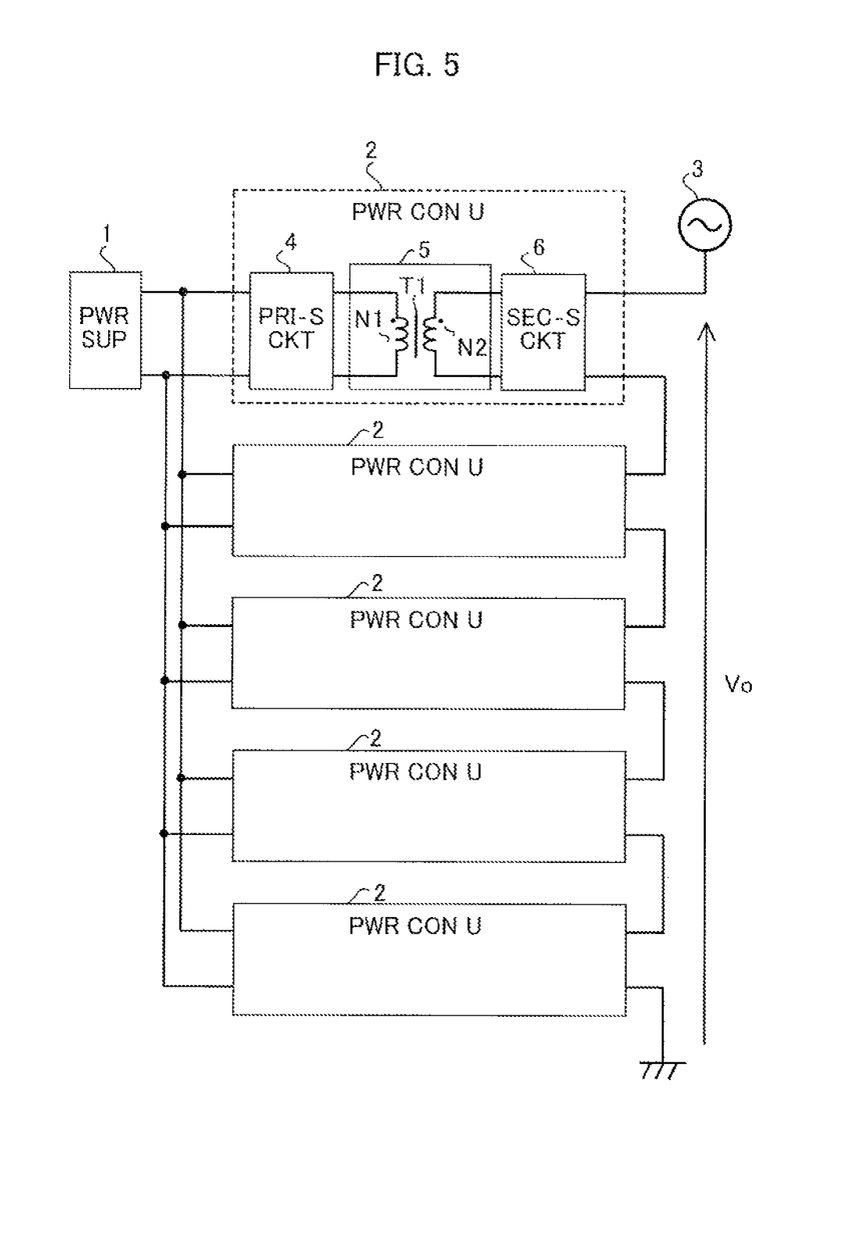
FIG. 5 is a diagram illustrating an example of the configuration of a circuit of an electric power converter using the transformers according to Embodiment 1.

FIG. 5 is a diagram illustrating an example of the configuration of a circuit of an electric power converter using the transformers 5 according to Embodiment 1.

An electric power converter of FIG. 5 includes a plurality of electric power conversion units 2, each composed of a primary-side circuit 4, the transformer 5, and a secondary-side circuit 6. The plurality of electric power conversion units 2 are connected in parallel and in series. This enables applications for high-voltage and large-electric-power use. More specifically, a plurality of the electric power conversion units 2 on the primary side are connected in parallel and those on the secondary side are connected in series.

The plurality of primary-side circuits 4 on the low-voltage side are connected, in parallel, to a power supply 1 and are each an inverter that operates the transformer 5, which is a high-frequency transformer operated with a high frequency of several kHz to 100 kHz. Each secondary-side circuit 6 on the high-voltage side is composed of a converter and an inverter and converts an output of the transformer 5 to an AC frequency of the system. The plurality of secondary-side circuits 6 are connected in series and supply a current to a 6-kv power distribution system 3.

Generally speaking, from the viewpoint of cooling performance and the structure, a magnetic core (hereinafter, referred to as a core) of the transformer 5 is mounted such that the potential thereof is the same as of the ground or low-voltage side. Because of this, in the circuit configuration of FIG. 5, as the potential of the electric power conversion unit 2 on the secondary side becomes higher, the potential difference between the secondary winding N2 and the corresponding core of the transformer 5 increases. Thus, it is necessary to keep a withstand voltage. Note that the cores may be supported by using an insulating material and may be mounted such that an intermediate potential between the primary winding side and the secondary winding side is provided. In this case, it is evident that the present invention can be used to retain a stable withstand voltage between each winding and the corresponding core.

Because in the transformer 5 of Embodiment 1, an air gap is retained by using the bobbin support part 52, the withstand voltage does not become deteriorated with time and the withstand voltage can thus be stable.

Embodiment 2

Figure 6:
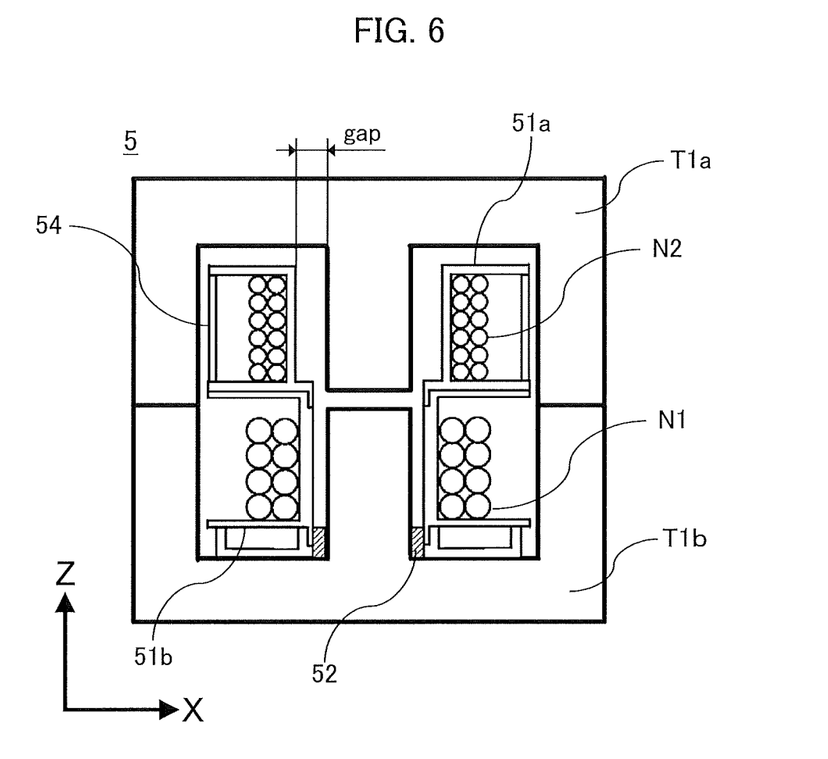
FIG. 6 is a cross-sectional view of a transformer according to Embodiment 2 when viewed along a central magnetic leg direction.
Figure 7:
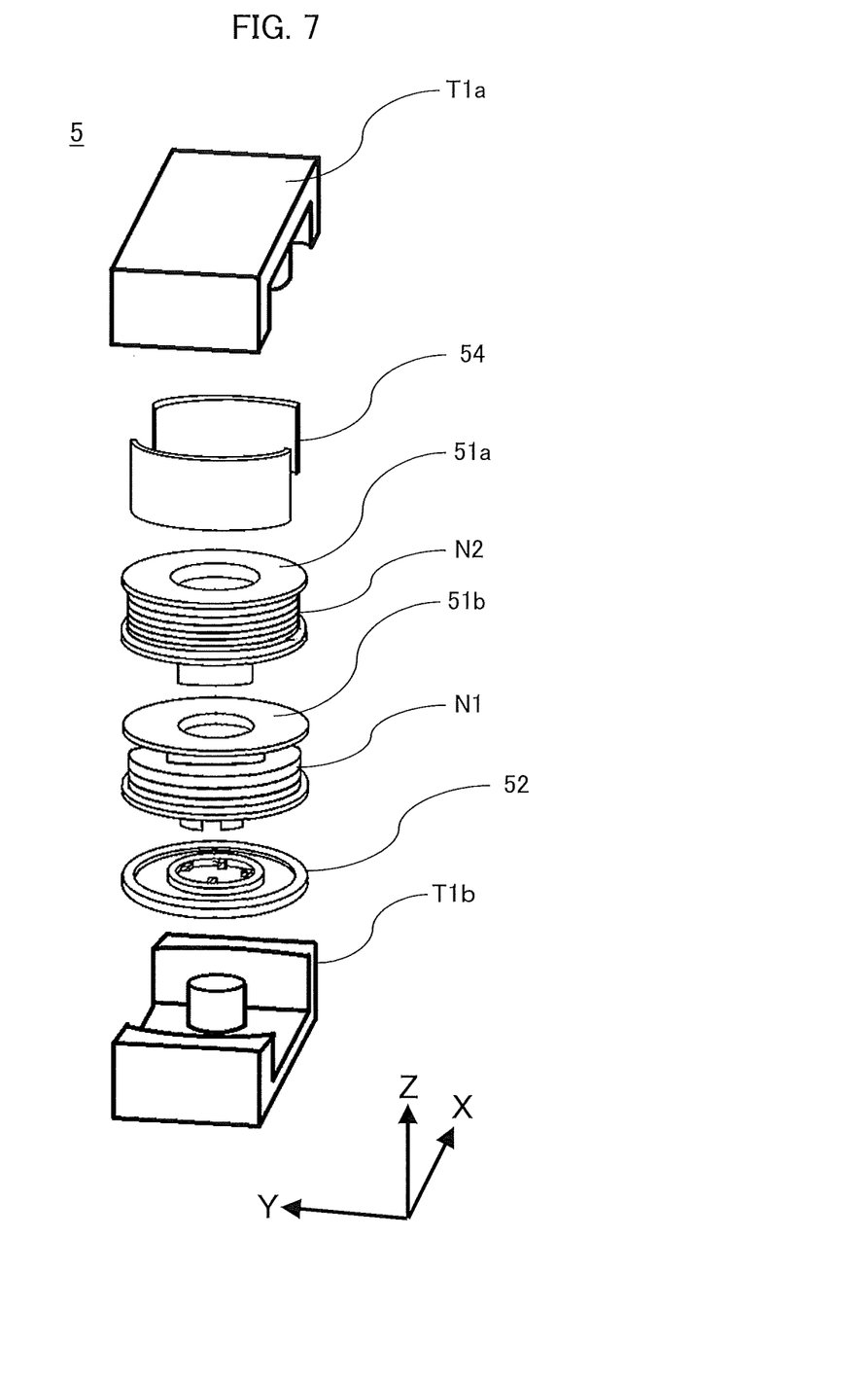
FIG. 7 is an exploded view of the transformer according to Embodiment 2 when viewed along a central magnetic leg direction.

Next, FIGS. 6 and 7 are used to describe another embodiment of the bobbin support structure.

Embodiment 2 provides, as an example, a transformer 5 in which a bobbin around which a primary winding N1 and a secondary winding N2 are wound, is made to have a divided configuration.

FIG. 6 is a cross-sectional view of the transformer 5 according to Embodiment 2 when viewed along a central magnetic leg direction.

In FIG. 6, the top-to-bottom direction (Z-axis direction) of the paper is defined as a gravity direction; and the left-to-right direction (X-axis direction) and a direction vertical to the paper face (Y-axis direction; not shown) define a horizontal surface perpendicular to the gravity direction.

The transformer 5 of Embodiment 2 is configured such that a primary-side circuit 4 (see FIG. 5) on the low-voltage side is connected to the primary winding N1, which is wound around a bobbin 51b, and a secondary-side circuit 6 (see FIG. 5) is connected to the secondary winding N2, which is wound around a bobbin 51a. In this way, electric power is transmitted from the primary-side circuit 4 to the secondary-side circuit 6.

Like the transformer 5 of Embodiment 1, the transformer 5 of Embodiment 2 includes the core T1a, the core T1b, the winding cover 54, and a bobbin support part 52.

The bobbin support part 52 is fit for the bobbin 51b around which the primary winding N1 is wound; and the bobbin 51b is fit for the bobbin 51a around which the secondary winding N2 is wound. In this way, the bobbins 51a and 51b and the bobbin support part 52 are fixed.

Then, a base portion of the central magnetic leg of the core T1b is fit into an opening of the bobbin support part 52, which supports the leg such that an air gap, a "gap", with a given size is retained between the bobbin 51a and the central magnetic leg of the core T1a. Specifically, the bobbin support part 52 is like Embodiment 1, and protrusions of the bobbin support part 52 are in contact with the base portion of the central magnetic leg of the core T1b.

The diameter of a center hole of the bobbin 51a is larger than that of the bobbin 51b, which increases the size of the air gap, a "gap", between the secondary winding N2 and the central magnetic leg of the core T1a.

This makes it possible to reduce a magnetic field concentration between the central magnetic leg of the core T1a and the bobbin 51a, around which a high voltage-superimposed secondary winding N2 is mounted. Consequently, insulation performance of the transformer 5 can be improved.

The bobbin support part 52 has center-side and outer-circumferential-side ridges and has a U-shaped cross section. This can improve the stability of the bobbins 51a and 51b while keeping an air gap between the bobbin 51b and the bottom-part magnetic leg of the core T1b and an air gap between the bobbin 51a and the bottom-part magnetic leg of the core T1a.

FIG. 7 is an exploded view of the transformer 5 shown in FIG. 6 when viewed along a central magnetic leg direction.

The bobbin support part 52 is fit for the central magnetic leg of the core T1b and this bobbin support part 52 is also fit for the bobbin 51b, around which the primary winding N1 is wound, and the bobbin 51b is then fit for the bobbin 51a, around which the secondary winding N2 are wound, to give a stacked structure.

The core T1a is placed on the core T1b.

Regarding the transformer 5 depicted in FIGS. 6 and 7, the primary winding N1 is arranged on the lower side in the gravity direction and the secondary winding N2 is arranged on the upper side. However, the secondary winding N2 may be arranged on the lower side in the gravity direction and the primary winding N1 may be arranged on the upper side.

In this case, the bobbin 51 is suspended by using the bobbin support part 52 and is placed on the core T1a.

In the transformer 5 of Embodiment 2, the primary winding N1-mounted bobbin and the secondary winding N2-mounted bobbin are formed separately. This configuration makes it possible to change the size of the air gap between the primary winding N1 and the central magnetic leg of the core T1b and the air gap between the secondary winding N2 and the central magnetic leg of the core T1a. Hence, the air gap may be adjusted depending on the potential difference between the secondary winding N2 and the corresponding core of the transformer 5 when a plurality of the transformers 5 of Embodiment 2 are connected in series.

Embodiment 3

It has been described that in the transformer 5 of Embodiment 1 or 2, the central magnetic leg of the cores T1a and T1b is arranged in the gravity direction. Next, the central magnetic leg of the cores T1a and T1b of a transformer 5 is arranged in a horizontal direction, namely in a direction perpendicular to the gravity direction.

Figure 8:
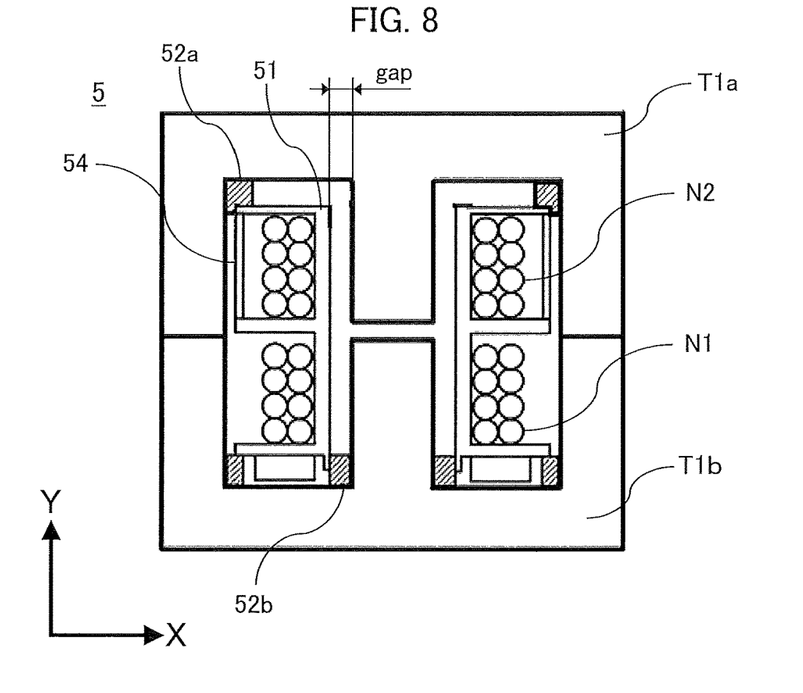
FIG. 8 is a cross-sectional view of a transformer 5 according to Embodiment 3 when viewed along a central magnetic leg direction.

FIG. 8 is a cross-sectional view of the transformer 5 according to Embodiment 3 when viewed along a central magnetic leg direction.

In FIG. 8, the bottom-to-top direction (Y-axis direction) and the left-to-right direction (X-axis direction) of the paper are defined as directions vertical to the gravity direction; and a direction vertical to the paper face (Z-axis direction; not shown) is defined as the gravity direction.

In Embodiments 1 and 2, the central magnetic leg of the cores T1a and T1b is arranged in the gravity direction. Accordingly, when either the core T1a or the core T1b is provided with the bobbin support part 52, the weights of the bobbin(s) and the windings are imposed on the bobbin support part 52, which defines a distance between each bobbin and the bottom-part magnetic legs of each core.

In Embodiment 3, the cores T1a and T1b each have a bobbin support part (52a, 52b), which defines a distance between the bobbin and the bottom-part magnetic legs of the corresponding core.

The transformer 5 of Embodiment 3 shown in FIG. 8 is structured such that a primary winding N1 and a secondary winding N2 are wound around a bobbin 51 and the bobbin 51 is fit into the cores T1a and T1b. A primary-side circuit 4 on the low-voltage side is connected to the primary winding N1 and a secondary-side circuit 6 is connected to the secondary winding N2. In this way, electric power is transmitted from the primary-side circuit 4 to the secondary-side circuit 6.

The bobbin 51 has sections, in which the primary winding N1 and the secondary winding N2 are separately mounted in the central magnetic leg direction, to give a sectioned winding configuration.

A winding cover 54 covers the secondary winding N2, and an insulation distance between the secondary winding N2 and an outer magnetic leg of the core T1a is thus kept.

A bobbin support part 52b is fit for the bobbin 51 around which the primary winding N1 and the secondary winding N2 are wound.

Then, a base portion of the central magnetic leg of the core T1b is fit into an opening of the bobbin support part 52b, which supports the leg such that an air gap, a "gap", with a given size is retained between the bobbin 51 and the central magnetic leg of the core T1a. Specifically, the bobbin support part 52b is like Embodiment 2, and protrusions of the bobbin support part 52b are in contact with the base portion of the central magnetic leg of the core T1b.

The bobbin support part 52b has center-side and outer-circumferential-side ridges and has a U-shaped cross section. This can improve the stability of the bobbin 51 while keeping an air gap between the bobbin 51 and the bottom-part magnetic legs of the core T1b.

In addition, protrusions on the outer circumferential portion of the bobbin support part 52b are fit for an internal surface of the outer magnetic leg of the core T1b.

Further, in the transformer 5 of Embodiment 3, the bobbin support part 52a is provided on the outer circumference of a flange of the bobbin 51 on the secondary winding N2 side and defines a distance between the bobbin 51 and the base magnetic portion of the core T1a.

This configuration provides fixation of the position of the bobbin 51 between the cores T1a and T1b.

Because the bobbin support part 52a is provided on the outer circumference of the flange of the bobbin 51 on the secondary winding N2 side, the bobbin support part 52a does not cause a decrease in withstand voltage between the secondary winding N2 and the central magnetic leg of the core T1a.

Figure 9:
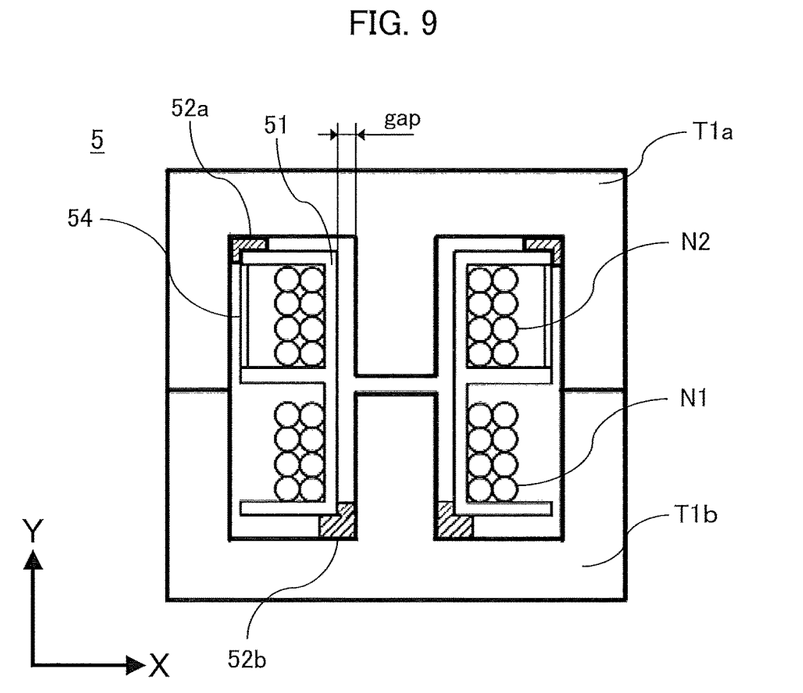
FIG. 9 is a cross-sectional view of the transformer in which a bobbin support part is modified in Embodiment 3.

FIG. 9 is a cross-sectional view of the transformer in which the bobbin support part 52b according to Embodiment 3 is modified.

In FIG. 9, a bobbin support part 52b is attached to a base portion of the central magnetic leg of the core T1b and is fit into a center hole of the bobbin 51 around which the primary winding N1 and the secondary winding N2 are wound. The central magnetic leg of the core T1b is fit into an opening of the bobbin support part 52b, which supports the leg such that an air gap, a "gap", with a given size is retained between the bobbin 51 and the central magnetic leg of the core T1a.

In addition, the bobbin support part 52b defines a distance between the bobbin 51 and the bottom-part magnetic leg of the core T1b.

Figure 10:
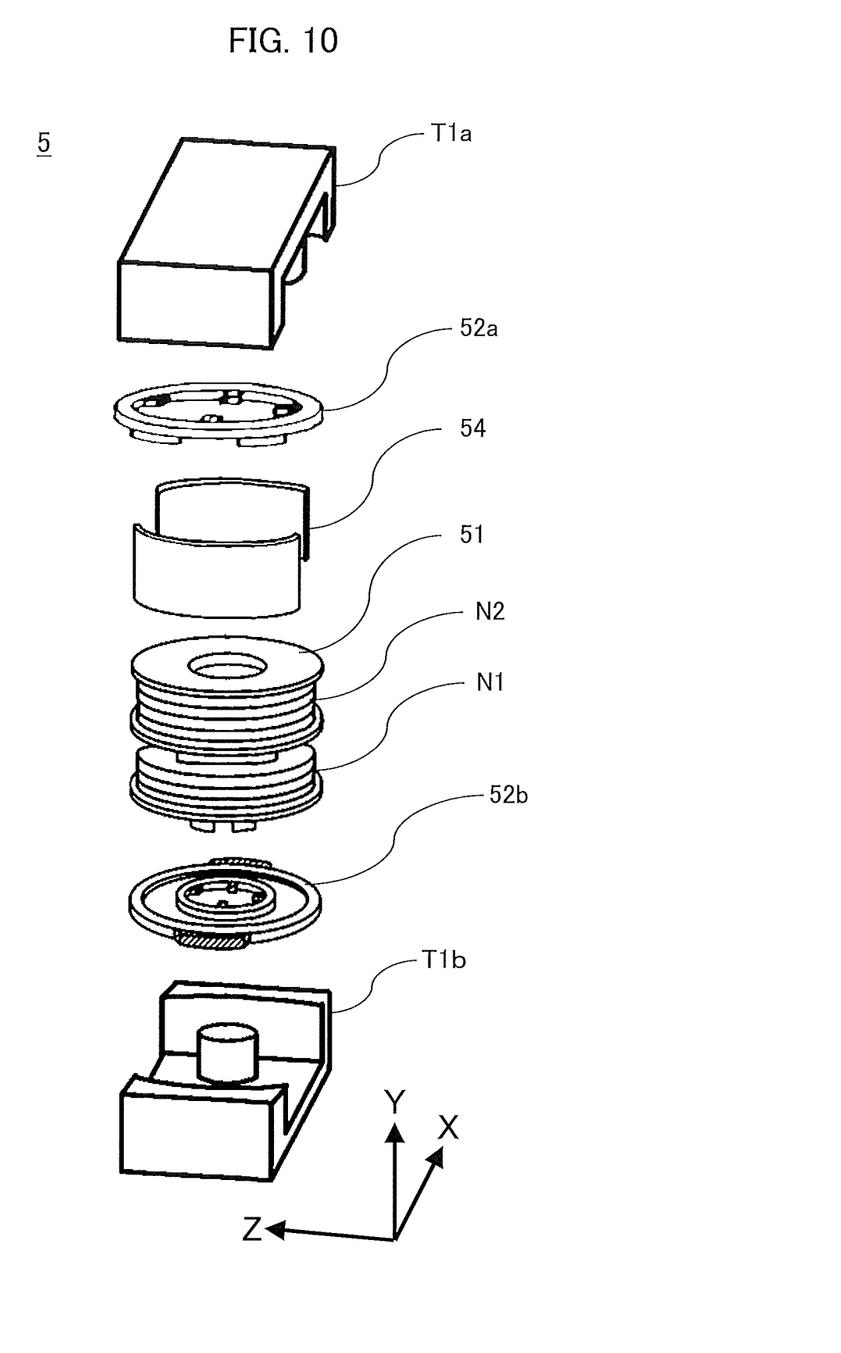
FIG. 10 is an exploded view of the transformer according to Embodiment 3 when viewed along a central magnetic leg direction.

FIG. 10 is an exploded view of the transformer 5 shown in FIG. 8 when viewed along a central magnetic leg direction.

The bobbin support part 52b is fit for the central magnetic leg of the core T1b and this bobbin support part 52b is also fit for the bobbin 51, around which the primary winding N1 and the secondary winding N2 are wound, to give a stacked structure in which the bobbin support part 52a is fit for the bobbin 51.

The core T1a is placed on the core T1b.

As shown in FIG. 10, the transformer 5 of Embodiment 3 likewise has a stacked structure. Accordingly, the central magnetic leg of the core T1b may be disposed in the gravity direction; and after assembly, the transformer 5 may be pushed sideways. This makes it easy to assemble the transformer 5.

In view of the above, this Embodiment 3 is configured such that each of both ends of the bobbin having the primary winding and the secondary winding is provided with each bobbin support part; and the center opening portion and the outer circumferential surface of the relevant bobbin support part have spacers. This can improve the stability of the bobbin.

In addition, an axis deviation between the bobbin center hole portion and the central magnetic leg of the cores can be decreased. This enables an air gap between the wall surface of the center hole portion of the bobbin and the central magnetic leg of each core to be provided uniformly, thereby making insulation performance between each winding and the corresponding core highly reliable.

Embodiment 3 has been used to describe when the central magnetic leg of the transformer 5 is arranged in the horizontal direction. The bobbin support structure is also applicable to a case where the central magnetic leg of the transformer 5 is placed in the gravity direction.

Embodiment 4

Figure 11:
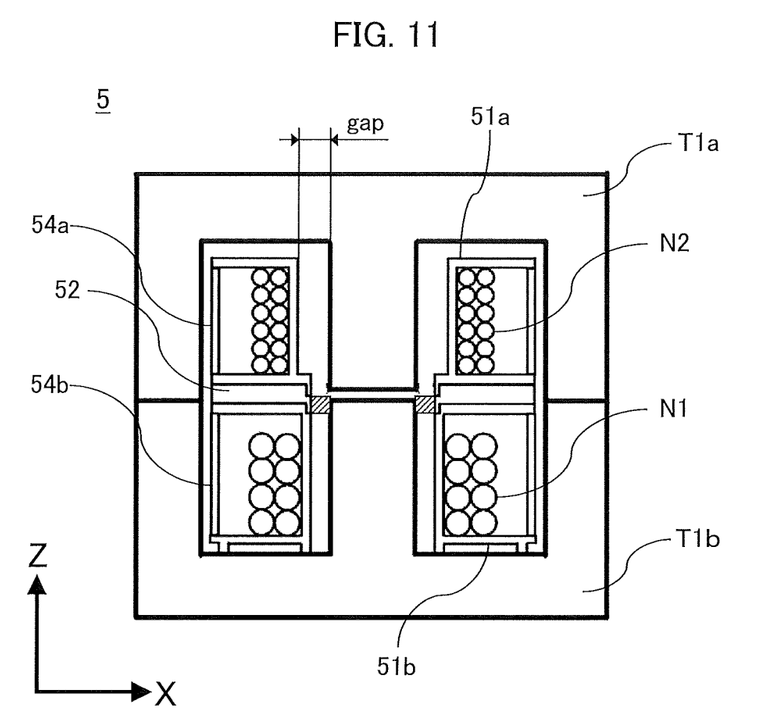
FIG. 11 is a cross-sectional view of a transformer according to Embodiment 4 when viewed along a central magnetic leg direction.
Figure 12:
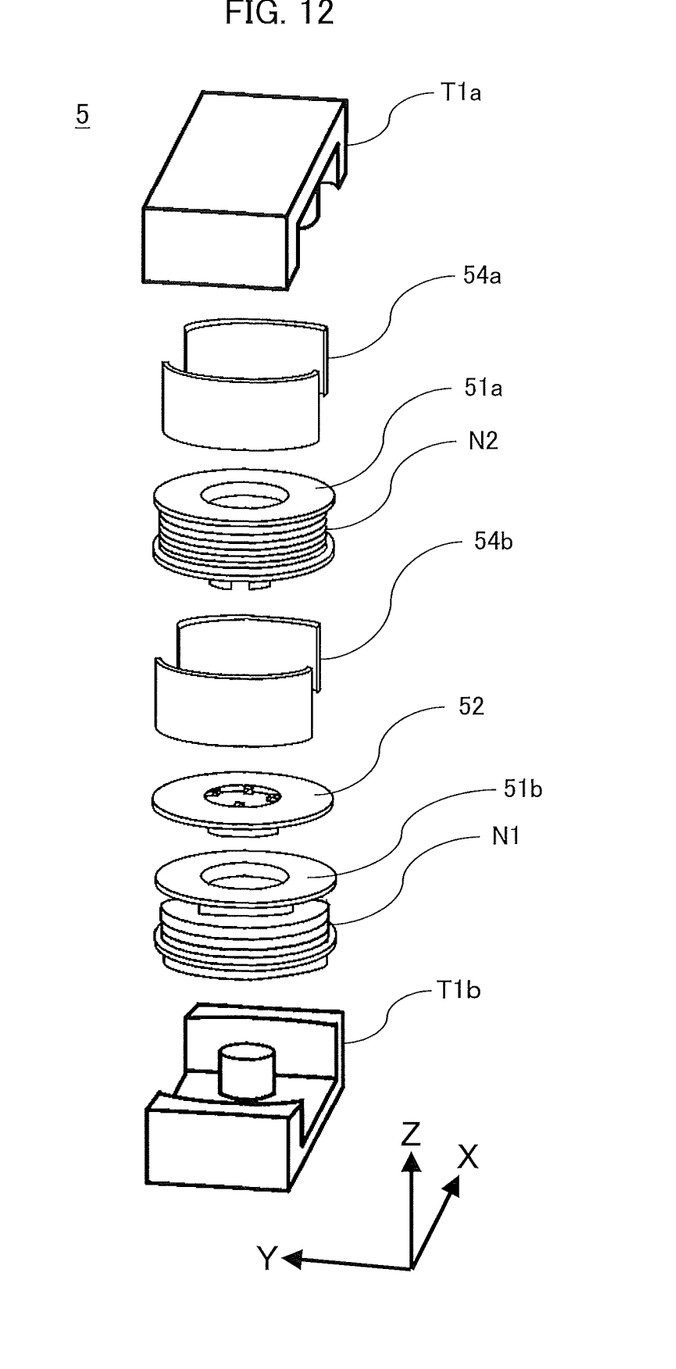
FIG. 12 is an exploded view of the transformer according to Embodiment 4 when viewed along a central magnetic leg direction.

Next, FIGS. 11 and 12 are used to describe another embodiment of the bobbin support structure.

The case of Embodiment 2 where the bobbin is divided has been described. Because the bobbin is divided, it is possible to enlarge the gap, a "gap", between the secondary winding N2 and the central magnetic leg of the core T1a. This makes smaller a decrease in withstand voltage due to the bobbin support part 52. Then, the position where the bobbin support part 52 is installed is changeable.

In Embodiment 4, the case where a bobbin support part 52 is installed on a center section of a bobbin is illustrated.

FIG. 11 is a cross-sectional view of a transformer 5 according to Embodiment 4 when viewed along a central magnetic leg direction.

In FIG. 11, the top-to-bottom direction (Z-axis direction) of the paper is defined as a gravity direction; and the left-to-right direction (X-axis direction) and a direction vertical to the paper face (Y-axis direction; not shown) define a horizontal surface perpendicular to the gravity direction.

The transformer 5 of Embodiment 4 is configured such that a primary-side circuit 4 (see FIG. 5) on the low-voltage side is connected to the primary winding N1, which is wound around a bobbin 51b, and a secondary-side circuit 6 (see FIG. 5) is connected to the secondary winding N2, which is wound around a bobbin 51a. In this way, electric power is transmitted from the primary-side circuit 4 to the secondary-side circuit 6.

Here, the transformer 5 of Embodiment 4 includes the core T1a, the core T1b, winding covers 54 (54a and 54b), and the bobbin support part 52.

The bottom of the bobbin 51b, around which the primary winding N1 is wound, has ridges on a center portion and an outer circumferential portion. These ridges retain a distance between the bobbin 51b and the base magnetic portion of the core T1b and a distance between the bobbin 51a and the bottom-part magnetic leg of the core T1a. Here, providing the center portion and the outer circumferential portion with the ridges can improve how stable the bobbin 51b is installed.

The disk-shaped bobbin support part 52 is stacked on and fit for the bobbin 51b.

Then, this bobbin support part 52 is fit for the bobbin 51a so as to fix the bobbins 51a and 51b.

At this time, the central magnetic leg of the core T1b is in contact with protrusions provided in an center opening of the bobbin support part 52, which is placed such that an air gap, a "gap", with a given size is retained between the bobbin 51a and the central magnetic leg of the core T1a.

The diameter of a center hole of the bobbin 51a is larger than that of the bobbin 51b, which increases the size of the air gap, a "gap", between the secondary winding N2 and the central magnetic leg of the core T1a.

This makes it possible to reduce a magnetic field concentration between the central magnetic leg of the core T1a and the bobbin 51a, around which a high voltage-superimposed secondary winding N2 is mounted. Consequently, insulation performance of the transformer 5 can be improved.

The winding cover 54a covers the secondary winding N2, and an insulation distance between the secondary winding N2 and an outer magnetic leg of the core T1a is thus kept.

The winding cover 54b covers the primary winding N1, and an insulation distance between the primary winding N1 and an outer magnetic leg of the core T1b is thus kept.

FIG. 12 is an exploded view of the transformer 5 shown in FIG. 11 when viewed along a central magnetic leg direction.

The bobbin 51b, around which the primary winding N1 is wound, is inserted along the central magnetic leg of the core T1b.

Next, the disk-shaped bobbin support part 52 is stacked on and fit for the bobbin 51b. At the same time, protrusions provided in the center opening of the bobbin support part 52 are in contact with the central magnetic leg of the core T1b. In this way, the bobbin 51b is fixed at the installation position.

Further, this bobbin support part 52 is fit for the bobbin 51a, around which the secondary winding N2 is wound, so as to fix the bobbin 51a, the bobbin support part 52, and the bobbin 51b.

The core T1a is placed on the core T1b.

The transformer 5 of Embodiment 4 is configured such that the primary winding N1-mounted bobbin 51b and the secondary winding N2-mounted bobbin 51a are formed separately; and the bobbin support part 52 is sandwiched between the separate bobbins. This can improve stability in response to a deviation between the center hole portion of the bobbin and the center axis of the central magnetic leg of the cores. This can thus keep uniform the air gap between a wall surface of the center hole portion of the bobbin and the central magnetic leg of the cores, thereby improving insulation performance and making it highly reliable.

Note that in Embodiment 4, the bobbin 51b, the bobbin support part 52, and the bobbin 51a are formed separately, but may be integrally molded.

Figure 13:
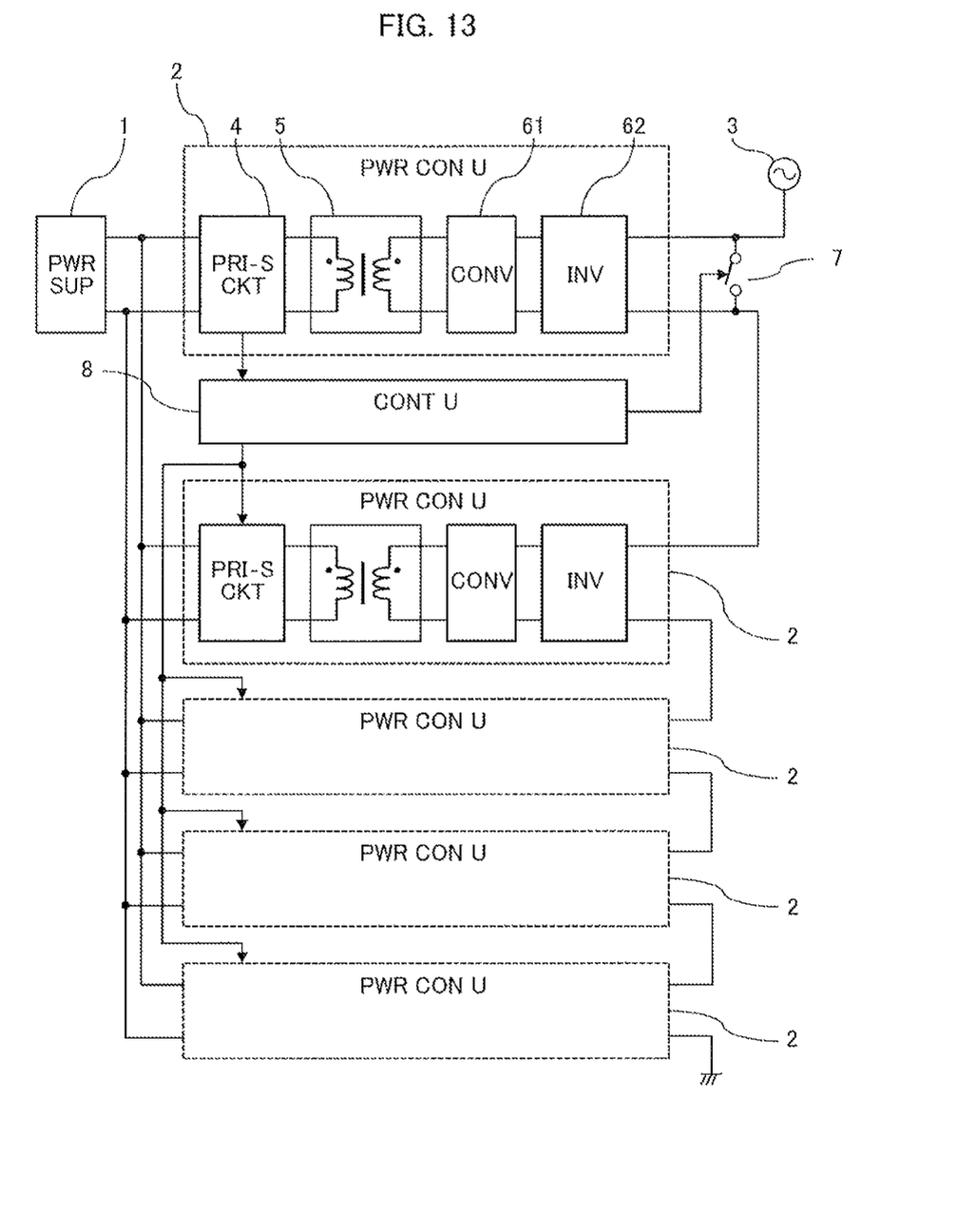
FIG. 13 is a diagram illustrating another example of the configuration of a circuit of the electric power converter.

Next, FIG. 13 describes another example of the configuration of a circuit of an electric power converter using the transformers 5 according to the above embodiments.

In the electric power converter of FIG. 13, a plurality of electric power conversion units 2, each including a primary-side circuit 4, the transformer 5, a converter 61, and an inverter 62 (a secondary-side circuit of FIG. 5), are connected in parallel and in series. This enables applications for high-voltage and large-electric-power use. More specifically, the plurality of electric power conversion units 2 on the primary side are connected in parallel and those on the secondary side are connected in series.

Further, the electric power converter is provided with a bypass switch 7 and a control unit 8. An electric power conversion unit 2 that has an insulation breakdown in the transformer 5 is cut off; and the rest electric power conversion units 2 are used to carry out a degraded operation.

The plurality of primary-side circuits 4 on the low-voltage side are connected, in parallel, to a power supply 1 and are each an inverter that operates the transformer 5, which is a high-frequency transformer operated with a high frequency of several kHz to 100 kHz. The output of the transformer 5 is input into the converter 61 and then the inverter 62, which converts it to an AC with a frequency of the system.

The plurality of electric power conversion units 2 are connected in series to supply a current to a 6-kv power distribution system 3.

The bypass switch 7 is a switch for shirt-circuiting or making the output of the inverter 62 open. Because the electric power conversion units 2 are connected in series, the bypass switch 7 is in a disconnected state under a normal condition. When an insulation breakdown of transformer 5 occurs, the control unit 8 makes the bypass switch 7 in a connected state and an electric power conversion unit 2 including the above transformer 5 is disconnected from the multiple serial connection.

The control unit 8 monitors an operation current of the primary-side circuit 4 and detects an insulation breakdown occurring in the transformer 5. Once the control unit 8 detects the insulation breakdown of the transformer 5, the control unit 8 short-circuits the bypass switch 7 in a connected state and an electric power conversion unit 2 including the above transformer 5 is disconnected from the multiple serial connections.

At this time, the control unit 8 controls the inverter operation condition of the primary-side circuit 4 of each of the electric power conversion units 2 other than the above electric power conversion unit 2 with the insulation breakdown detected; and the control unit 8 makes the output voltage of the inverter 62 larger so as to compensate the output voltage of the above electric power conversion unit 2 cut off from the multiple serial connection.

In this way, the control unit 8 performs a degraded operation of the electric power converter, so that the operation of the electric power converter continues at the same output voltage as before the insulation breakdown of the transformer 5 occurs.

In the electric power converter of FIG. 13 where a plurality of the electric power conversion units 2 are connected in parallel and in series, a transformer 5 of an electric power conversion unit 2 having the largest potential is likely to have an insulation breakdown. Because the transformers 5 according to the above embodiments are used, insulation performance of each transformer 5 becomes less deteriorated with time and it is possible to limit the number of the electric power conversion units 2 equipped with the bypass switch 7. This can reduce the cost.

In addition, the present invention is not limited to the above embodiments, and various modifications are allowed. The above embodiments are provided so as to explain, in detail, the present invention in an understandable manner. Thus, the present invention is not necessarily limited to embodiments including all the elements described. In addition, part of the configuration of a certain embodiment may be replaced by the configuration of another embodiment. Further, the configuration of a certain embodiment may be added to the configuration of another embodiment.

REFERENCE SIGNS LIST

5 Transformer
T1a Core
T1b Core
N1 Winding
N2 Winding
51 Bobbin
52 Bobbin support part
54 Winding cover

The invention claimed is:

1. A transformer comprising:
   a core;
   a bobbin in which a low-voltage-side primary winding and a high-voltage-side secondary winding are disposed along a central magnetic leg of the core; and
   a bobbin support part that supports the bobbin at an end of the bobbin on a primary winding side to provide an air gap between the central magnetic leg of the core and a surface of the bobbin corresponding to the secondary winding;
   wherein the bobbin support part is fit to a base portion of the central magnetic leg of the core and into a center hole of the bobbin; and
   wherein the bobbin support part includes a plurality of protrusions provided along a circumferential direction of an opening thereof, the protrusions projecting radially inward toward the central magnetic leg of the core and being fit to the base portion of the central magnetic leg of the core.

2. The transformer according to claim 1, wherein the bobbin support part is fit to a base portion of an internal surface of an outer magnetic leg of the core and to an outer circumference of a flange of the bobbin on the primary winding side.

3. The transformer according to claim 2, wherein
the bobbin support part includes a plurality of protrusions provided along a circumferential direction of an outer circumference thereof, the protrusions being fit to the base portion of the internal surface of the outer magnetic leg of the core.

4. The transformer according to claim 1, wherein
the bobbin support part defines a distance between a bottom-part magnetic leg of the core and the bobbin.

5. The transformer according to claim 1, wherein
a diameter of a center hole of a bobbin section around which the secondary winding is wound is larger than a diameter of a center hole of a bobbin section around which the primary winding is wound.

6. The transformer according to claim 5, wherein
the bobbin section around which the secondary winding is wound is separated from the bobbin section around which the primary winding is wound.

7. The transformer according to claim 1, wherein
the central magnetic leg of the core is disposed in a gravity direction; and
the primary winding is placed on a lower side in the gravity direction and the secondary winding is placed on an upper side in the gravity direction.

8. The transformer according to claim 1, further comprising:
a bobbin support part on a secondary winding side, the bobbin support part being fit to a base portion of an internal surface of an outer magnetic leg of the core on the secondary winding side and to an outer circumference of a flange of the bobbin on the secondary winding side.

9. The transformer according to claim 8, wherein
the bobbin support part at the end of the bobbin on the primary winding side and the bobbin support part on the secondary winding side define a distance between a bottom-part magnetic leg of the core and the bobbin.

10. A transformer comprising:
a core;
a second bobbin around which a high-voltage-side secondary winding is wound along a central magnetic leg of the core;
a bobbin support part fit to the second bobbin and on which the second bobbin is stacked; and
a first bobbin around which a low-voltage-side primary winding is wound along the central magnetic leg of the core, the bobbin support part being stacked on and fit to the first bobbin, wherein
the bobbin support part includes a plurality of protrusions provided along a circumferential direction of an opening thereof, the protrusions projecting radially inward toward the central magnetic leg of the core and being fit to the central magnetic leg of the core to provide an air gap between the central magnetic leg of the core and a surface corresponding to the secondary winding of the second bobbin.

11. An electric power converter comprising:
a plurality of electric power conversion units, each including the transformer according to claim 1, a primary-side circuit, and a secondary-side circuit,
wherein multiple inputs of the plurality of electric power conversion units are connected in parallel and multiple outputs of the plurality of electric power conversion units are connected in series.

12. The electric power converter according to claim 11, further comprising:
a bypass switch configured to short-circuit and open an output of an electric power conversion unit having a largest output potential; and
a control unit configured to monitor a current of the primary-side circuit of the electric power conversion unit having the largest output potential and detect a presence or absence of an insulation breakdown of a corresponding transformer and configured to, when the insulation breakdown is detected, make the bypass switch in a short-circuited state and control the primary-side circuits of the electric power conversion units other than the electric power conversion unit connected to the bypass switch so as to increase an output voltage of the electric power conversion units.

* * * * *